United States Patent [19]

Fioretti

[11] Patent Number: 4,775,210
[45] Date of Patent: Oct. 4, 1988

[54] VOICE AND DATA DISTRIBUTION SYSTEM WITH FIBER OPTIC MULTINODE STAR NETWORK

[75] Inventor: Alberto Fioretti, Rome, Italy

[73] Assignee: Alcatel N.V., Amsterdam, Netherlands

[21] Appl. No.: 905,085

[22] Filed: Sep. 8, 1986

[30] Foreign Application Priority Data

Sep. 10, 1985 [IT] Italy ............................ 22097 A/85

[51] Int. Cl.⁴ ..................... G02B 6/28; G02F 1/00
[52] U.S. Cl. ..................... 350/96.16; 350/96.15; 350/96.22; 455/612; 455/617
[58] Field of Search ............ 350/96.10, 96.15, 96.16, 350/96.20, 96.22, 96.24; 455/600, 610, 612, 617; 250/227

[56] References Cited

U.S. PATENT DOCUMENTS

| | | |
|---|---|---|
| 4,062,043 | 12/1977 | Zeidler et al. .................. 455/612 |
| 4,543,666 | 9/1985 | Witte et al. .................... 455/612 |
| 4,555,810 | 11/1985 | Khoe et al. .................... 455/612 |
| 4,646,361 | 2/1987 | Usui ............................. 455/612 |
| 4,707,062 | 11/1987 | Abe et al. ..................... 350/96.16 |
| 4,708,424 | 11/1987 | Marhic .......................... 350/96.16 |
| 4,712,859 | 12/1987 | Albanese et al. ............... 350/96.16 |
| 4,726,644 | 2/1988 | Mathis .......................... 350/96.16 |
| 4,727,601 | 2/1988 | Konishi ......................... 455/612 |
| 4,736,465 | 4/1988 | Bobey et al. ................... 455/612 |

Primary Examiner—William L. Sikes
Assistant Examiner—Brian M. Healy
Attorney, Agent, or Firm—Christie, Parker & Hale

[57] ABSTRACT

This invention fits the technical sector of the voice and data digital telecommunication networks by means of optical fibers and relates to a fiber optic distribution system for voice and data with star network, i.e. a network in which all the terminals are connected to a central node, in which this latter is replaced by a multinode distributed structure for enhancing the network reliability.

2 Claims, 1 Drawing Sheet

VOICE AND DATA DISTRIBUTION SYSTEM WITH FIBER OPTIC MULTINODE STAR NETWORK

TECHNICAL FIELD

This invention relates to a voice and data distribution system for voice and data transmission using a fiber optic multinode star network, preferably in the form of a Local Area Network (LAN).

BACKGROUND ART

Optical transmission with lightwaves propagating through a transparent solid medium has recently been the subject of prominent development in the telecommunication field. Optical telecommunication networks employ optical waveguides called "optical fibers" because of their physical structure. These optical fibers, linking several end users, may be used to construct terminal networks of varying complexity.

When all terminals of such a network are linked to a single central node, then the network is called a "star" network. In the known types of such star networks, the sole central node to which all terminals are connected is either active or passive. In the first case, a representative active star node may be by a signal repeater or a switching network. In the second case, a representative passive star node may be an optical signal coupler—the optical signal coupler may be either reflective or transmissive.

In the usual type of star network which employs an optical signal coupler, the latter functions as a central star node, because it joins all the optical fibers that link the transmitters to the receivers of a plurality of terminals. In such a star network, however, if the sole star center node fails, is paralyzes the whole system served by the network.

Accordingly, in order to improve the network reliability and make it less sensitive to the failure of such a sole star center node, in accordance with the known prior art, the star center is duplicated, as are the respective links between the terminals and the duplicated central node.

Such a prior art solution has the drawback of halving the power of the signals between the terminals. Consequently, there is a loss of about three decibels in addition to path attenuation of the generic (single node star center) system.

This drawback is particularly burdensome in passive star networks, in which a single star center node already contributes an insertion loss of about 10 ($\log_{10} n$) decibels, where n is the number of terminals.

DISCLOSURE OF INVENTION

A principal object of the present invention is to overcome the aforesaid drawbacks, with respect to the currently used systems, by providing a distribution system for voice and data utilizing a novel fiber optic multinode star network, in which a plurality of nodal couplers form a multiple node star center which is physically distributed over a certain area but which in every other respect functions as a virtual star center. It should be understood that a "multinode star center" is a system for distributing an optical signal from any of n inlets to any of n outlets.

This object and others, as will be better understood from the detailed description which follows, are attained in a novel voice and data distribution system having a fiber optic multinode star network characterized in that it comprises a virtual star center implemented as a plurality of nodal optical couplers for transmitting the optical signals and which together constitutes a multiple node star center physically distributed over a certain area. In such a system, the nodal optical couplers are connected in accordance with the following criteria:

(a) the n outputs of the first node, transmission side, are subdivided in m indifferent groups, each of the m groups being connected by n/m optical fiber links to the inputs 1, 2 . . . , n/m of a corresponding node on the receiving side;

(b) the n outputs of the second node, transmission side are subdivided into m different groups, each connected by n/m optical fiber links to the inputs n/m+1, n/m+2, . . . , 2n/m of the corresponding node of the receiving side;

(c) the n outputs of each of the remaining nodes of the transmission side are similarly distributed across the inputs of the nodes of the receiving side.

BRIEF DESCRIPTION OF DRAWINGS

Further features and advantages of this invention will be more evident from the following detailed description of a novel voice and data distribution system having a fiber optic multinode star network which refers to the accompanying drawings of a presently preferred exemplary embodiment, in which.

BEST MODE FOR CARRYING OUT THE INVENTION

Figure 1:
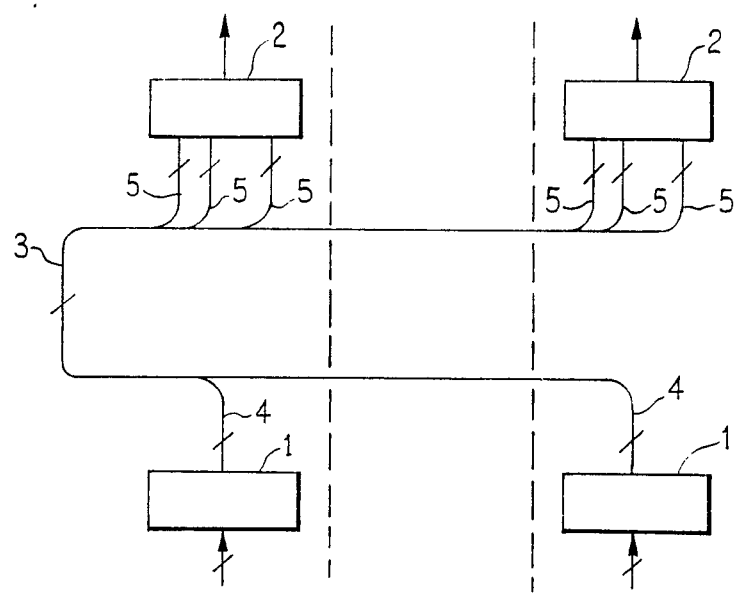
FIG. 1 shows a generic linking scheme of a virtual star center node in accordance to the present invention.

Referring now in particular to FIG. 1, reference numeral 1 indicates individual ones of several optical couplers each constituting a transmission side node, which are linked to a corresponding number of receiving side optical couplers 2 through a fiber optic cable 3.

The outputs of the transmitting nodes 1 have been indicated with the reference numeral 4, while the inputs in the corresponding receiving side nodes 2 have been indicated with reference numeral 5.

Figure 2:
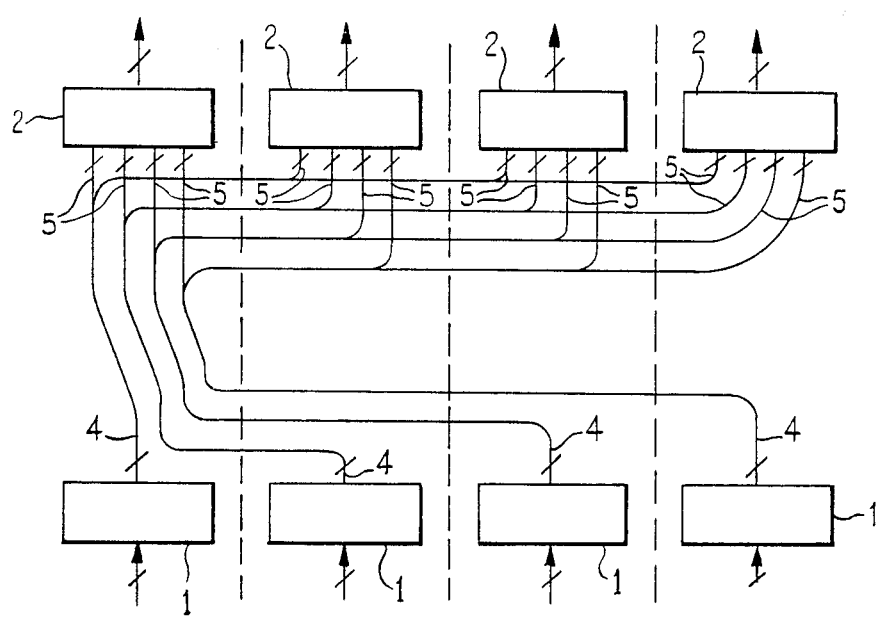
FIG. 2 shows a circuit embodiment of a virtual star center node by means of eight optical couplers for transmitting optical signals which are connected according to this invention.

In the embodiment of FIG. 2, the transmission side optical couplers 1 are four in number, and the reception couplers 2 are likewise four in number; each coupler has eight outputs. The eight optical fibers 4 leaving each of the transmission side couplers 1 lead sequentially, in pairs 5, to each receiving side coupler 2.

The foregoing description has been in structural terms; however, the criteria in accordance with which the system components are linked will according to the present invention will now be described in detail.

First of all, it should be noted that if m is the quantity of the optical couplers 1 or 2 respectively on the transmission and receiving sides of the corresponding number of input and output nodes, and if n is the number of inputs to or outputs from each coupler (the number of inputs equals the number of outputs), then both the product n·m and the ratio n/m should be integers so that the necessary connections may be carried out.

The connection criteria are the following, bearing in mind that each node and optical coupler on either side (transmission or reception) has an associated ordinal number and constitutes a single nodal optical coupler:

the n outputs 4 of the first transmission side coupler 1 are divided in m different groups, each such group being connected to n/m optical fibers 5 via a suitable connection means;

each such group leads to a respective one of the m receiving side optical couplers 2; more particularly, the respective individual optical fibers 4 are connected to the 1, 2, ..., n/m inputs 5 of each reception side optical coupler 2;

the n outputs 4 of the second transmission side coupler 1, are divided in m different groups each linked to n/m optical fibers 5 via a suitable connection;

each such group leads to a respective one of the m receiving side optical couplers 2; more particularly, the respective individual optical fibers 4 are connected to the n/m+1, n/m+2, ..., 2n/m outputs 5 of each receiving side node (optical coupler) 2;

the n outputs 4 of each of the other transmission side couplers 1 are distributed in the same way to the inputs 5 of the receiving side couplers 2.

The above is highlighted in the specific example illustrated in FIG. 2, which is implements a star center node with transmission type optical couplers where: n=8 and m=4. In that example, there are 8 nodal optical couplers, four couplers 1 on the transmission side and four couplers 2 on the receiving side as well as 32 fiber optic connections (n·m=8·4=32).

The invention thus has accomplished its intended objects. In fact, by means of the present multinodal network, the system becomes much more reliable, because the failure of one coupler does not put the whole network out of use. At the same time the resultant structure is much more modular and therefore also easier to test for proper operation.

Obviously the present invention is not limited to the sole embodiment described above, but many modifications and variants regarding the its operation and the overall system structure are possible which have related objects and which fall within the intended scope of the invention.

I claim:

1. A fiber optic multinode star network for a voice and data distribution system characterized in that it includes a virtual star center node having n·m inlets and n·m outlets, said virtual star center node comprising m pairs of transmission type nodal optical couplers each having n inputs and n outputs and whose totality constitutes a multiple node star center distributed over a certain area, each of said m pairs of transmission type nodal optical couplers constituting one node pair of said multinode star center and being connected according to the following criteria:

(a) the n outputs of the transmission side of the first node pair are subdivided into m different first groups, each of said first groups being respectively linked by a respective first set of n/m optical fibers to the first n/m inputs of the reception side of each respective node pair;

(b) the n outputs of the transmission side of the second node pair are subdivided into m different second groups, each of said second groups being respectively linked by a respective second set of n/m optical fibers to the second n/m inputs of the reception side of each respective node pair;

(c) the n outputs of the transmission side of each remaining ith node pair are subdivided into m different respective ith groups, each of said ith groups being respectively linked by a respective ith set of n/m optical fibers to the ith n/m inputs of the reception side of each respective node pair.

2. A fiber optic multinode star network according to claim 1, characterized in that both the ratio n/m and the product n·m are always integers greater than 1.

* * * * *